(12) United States Patent
Lee et al.

(10) Patent No.: US 8,275,308 B2
(45) Date of Patent: Sep. 25, 2012

(54) METHOD FOR RELAYING BETWEEN A BASE STATION AND A MOBILE STATION

(75) Inventors: Hyo-Jin Lee, Daejeon (KR); Hee-Soo Lee, Daejeon (KR); Hyun-Kyu Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 644 days.

(21) Appl. No.: 12/443,670

(22) PCT Filed: Jul. 16, 2007

(86) PCT No.: PCT/KR2007/003441
§ 371 (c)(1),
(2), (4) Date: Mar. 30, 2009

(87) PCT Pub. No.: WO2008/038895
PCT Pub. Date: Apr. 3, 2008

(65) Prior Publication Data
US 2010/0099352 A1   Apr. 22, 2010

(30) Foreign Application Priority Data

Sep. 29, 2006  (KR) .................. 10-2006-0095517

(51) Int. Cl.
*H04B 3/36* (2006.01)
(52) U.S. Cl. .......................................... 455/7; 455/11.1
(58) Field of Classification Search ............. 455/7, 11.1, 455/12.1, 15, 19, 23, 422.1, 550.1, 557
See application file for complete search history.

(56) References Cited

U.S. PATENT DOCUMENTS

| | | | |
|---|---|---|---|
| 6,070,072 A | 5/2000 | Dorenbosch et al. | |
| 7,944,871 B2 * | 5/2011 | Imamura et al. | 370/315 |
| 7,945,000 B2 * | 5/2011 | Miyoshi et al. | 375/340 |
| 2009/0092072 A1 * | 4/2009 | Imamura et al. | 370/315 |
| 2011/0165835 A1 * | 7/2011 | Horiuchi et al. | 455/7 |

FOREIGN PATENT DOCUMENTS

| | | |
|---|---|---|
| EP | 1843488 A1 | 10/2007 |
| JP | 8-32558 | 2/1996 |
| JP | 8-47045 | 2/1996 |
| JP | 8-47047 | 2/1996 |
| WO | WO-2005/008947 A1 | 1/2005 |
| WO | WO-2006/090669 A1 | 8/2006 |

* cited by examiner

*Primary Examiner* — Henry Choe
(74) *Attorney, Agent, or Firm* — Nelson Mullins Riley & Scarborough LLP; EuiHoon Lee, Esq.

(57) ABSTRACT

Disclosed is a cooperative relay station that relays between a base station and a mobile station when retransmitting a signal. Also, disclosed is a base station that receives a signal from a mobile station in mutual cooperation with the cooperative relay station. After the cooperative relay station receives and decodes a signal that the mobile station transmits to the base station or a service relay station, if an error of the decoded signal does not exist, it stores the received signal. If an error occurs when the base station decodes the signal that the mobile station transmits, the base station requests retransmission for the signal with the error to the cooperative relay station. If the cooperative relay station gets a request of retransmission, it transmits the signal that the base station requests to the base station. In this was, since an error rate may be reduced when the base station requests retransmission of the signal, resource reuse efficiency may become improved, interference may be reduced, and it is easy to adapt to a service being sensitive to time delay.

7 Claims, 8 Drawing Sheets

[Fig. 1]
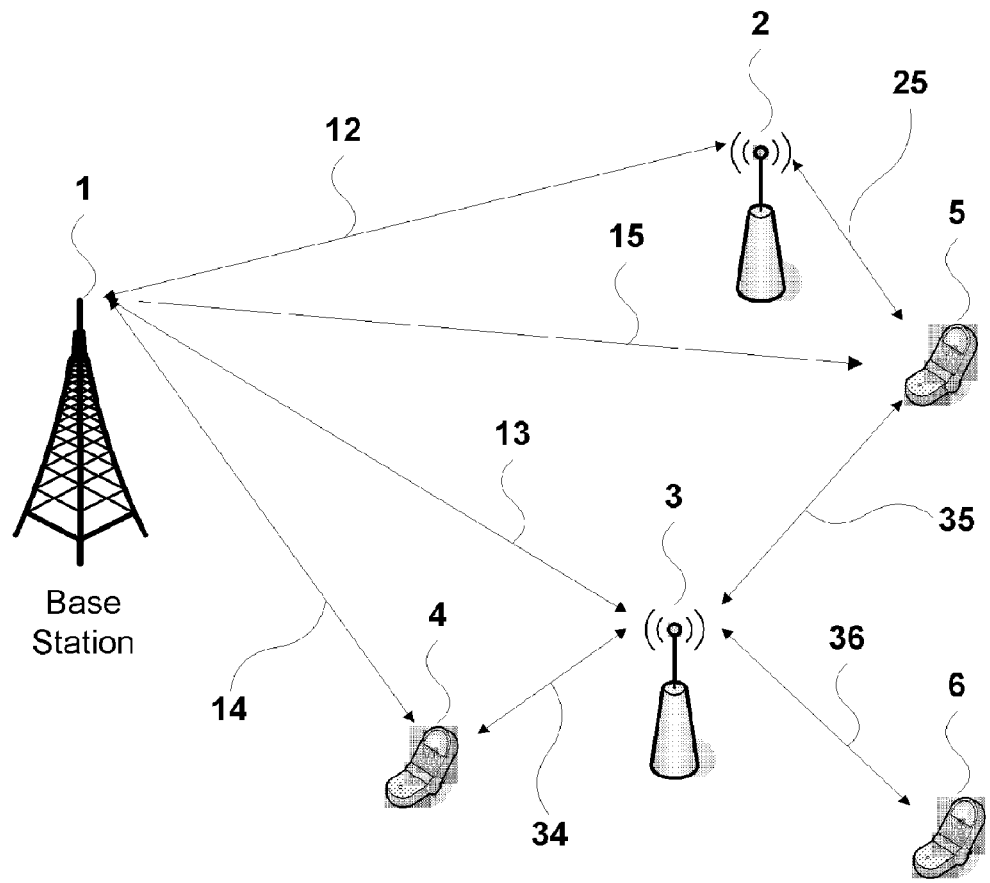
[Fig. 2]
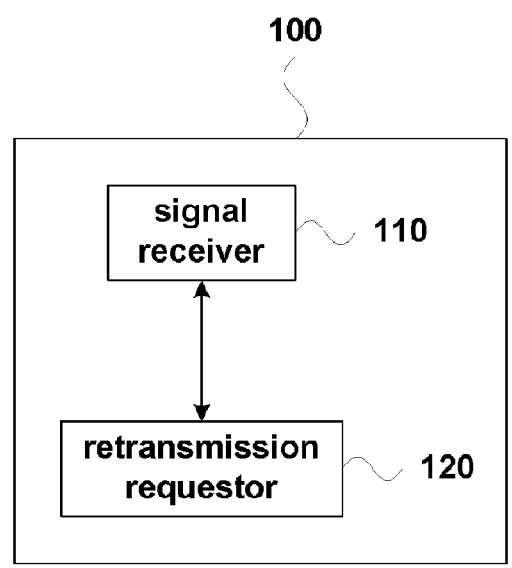

[Fig. 3]
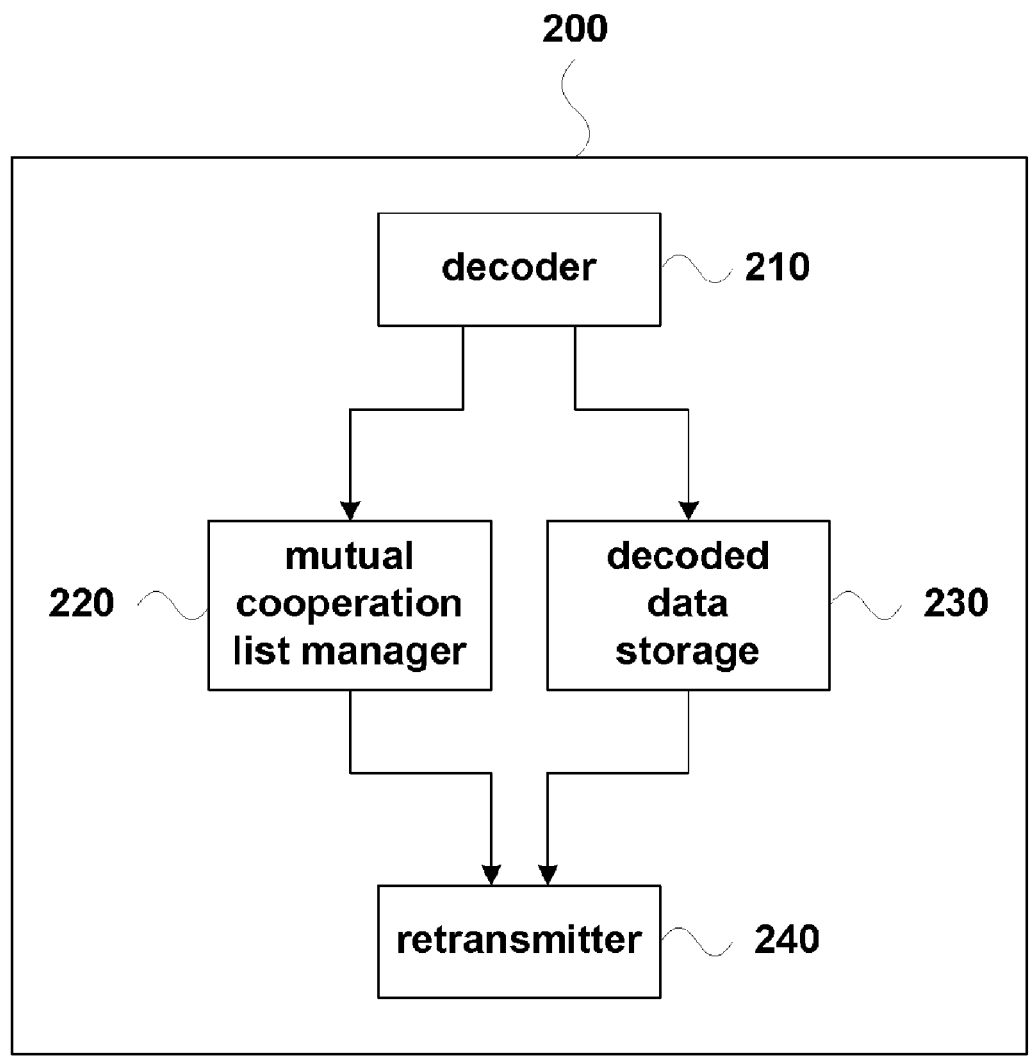

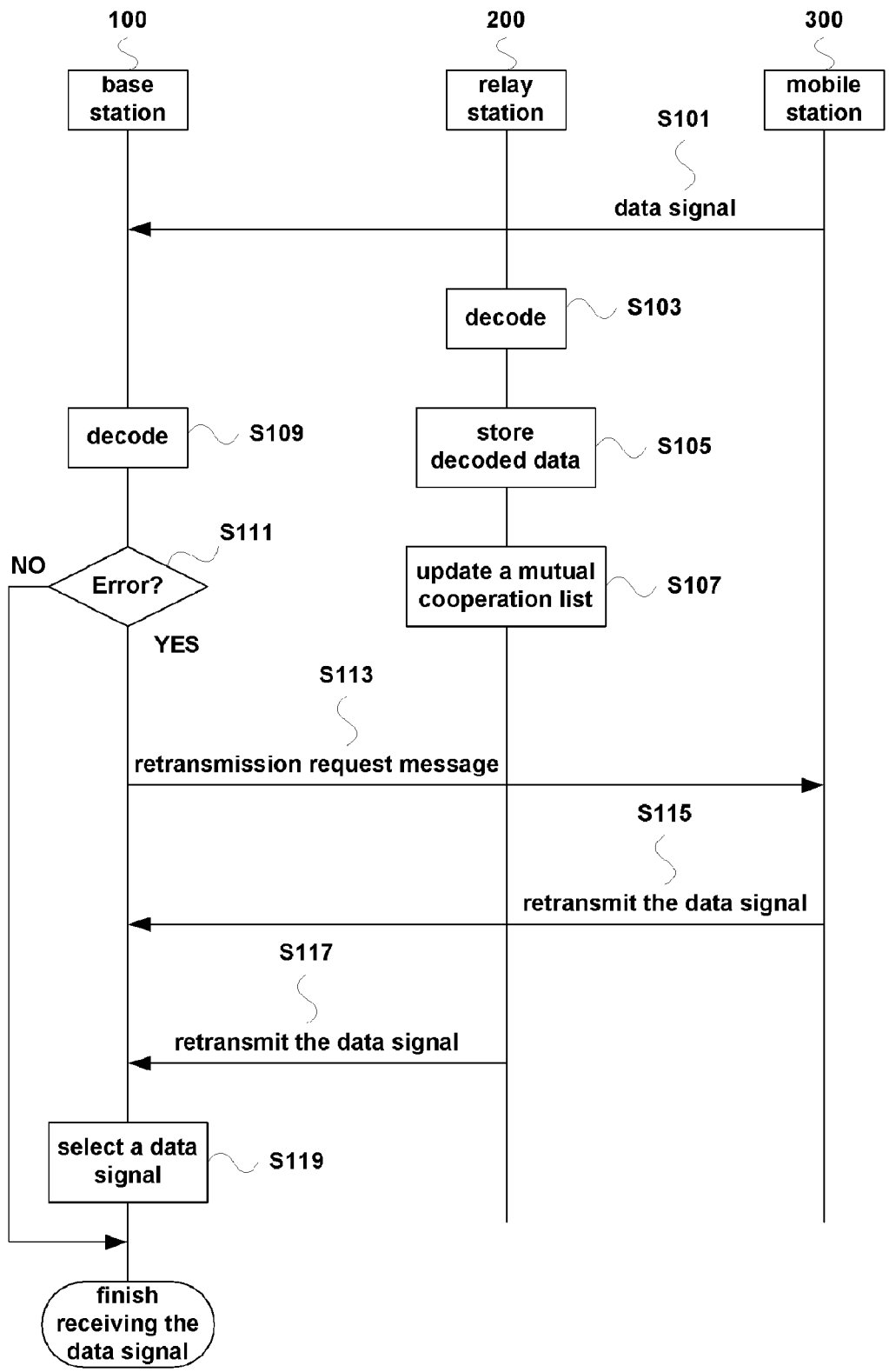

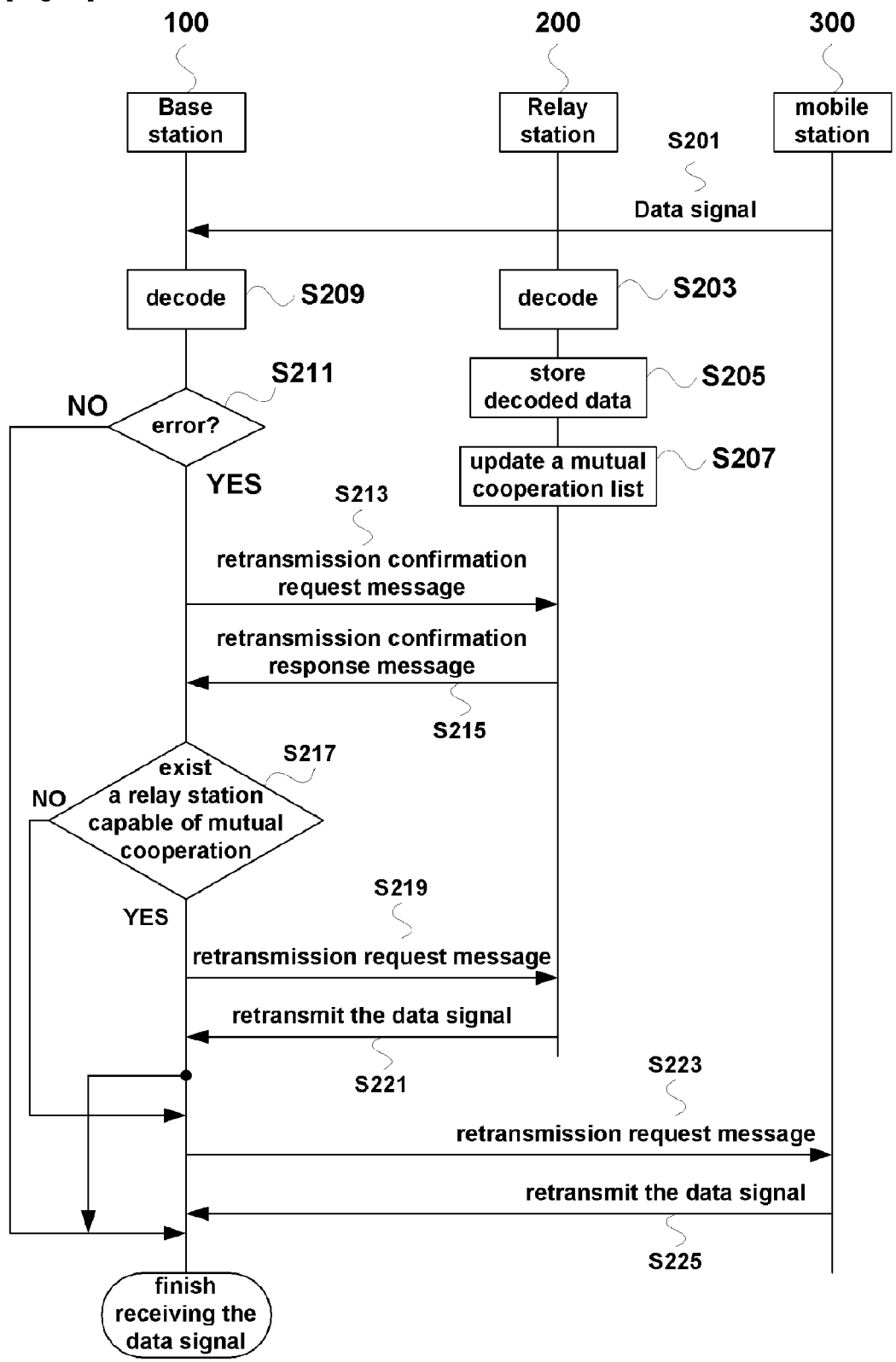

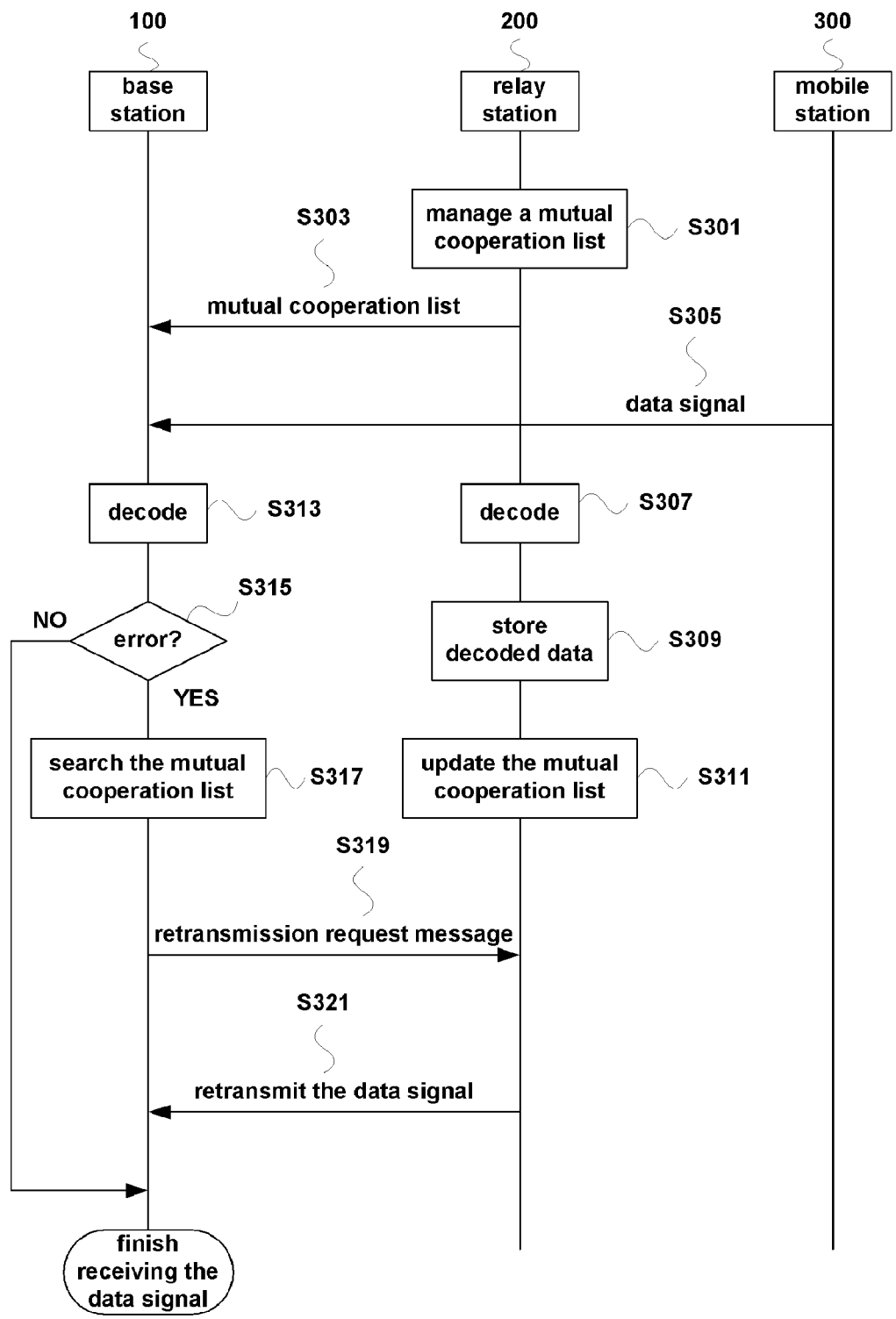

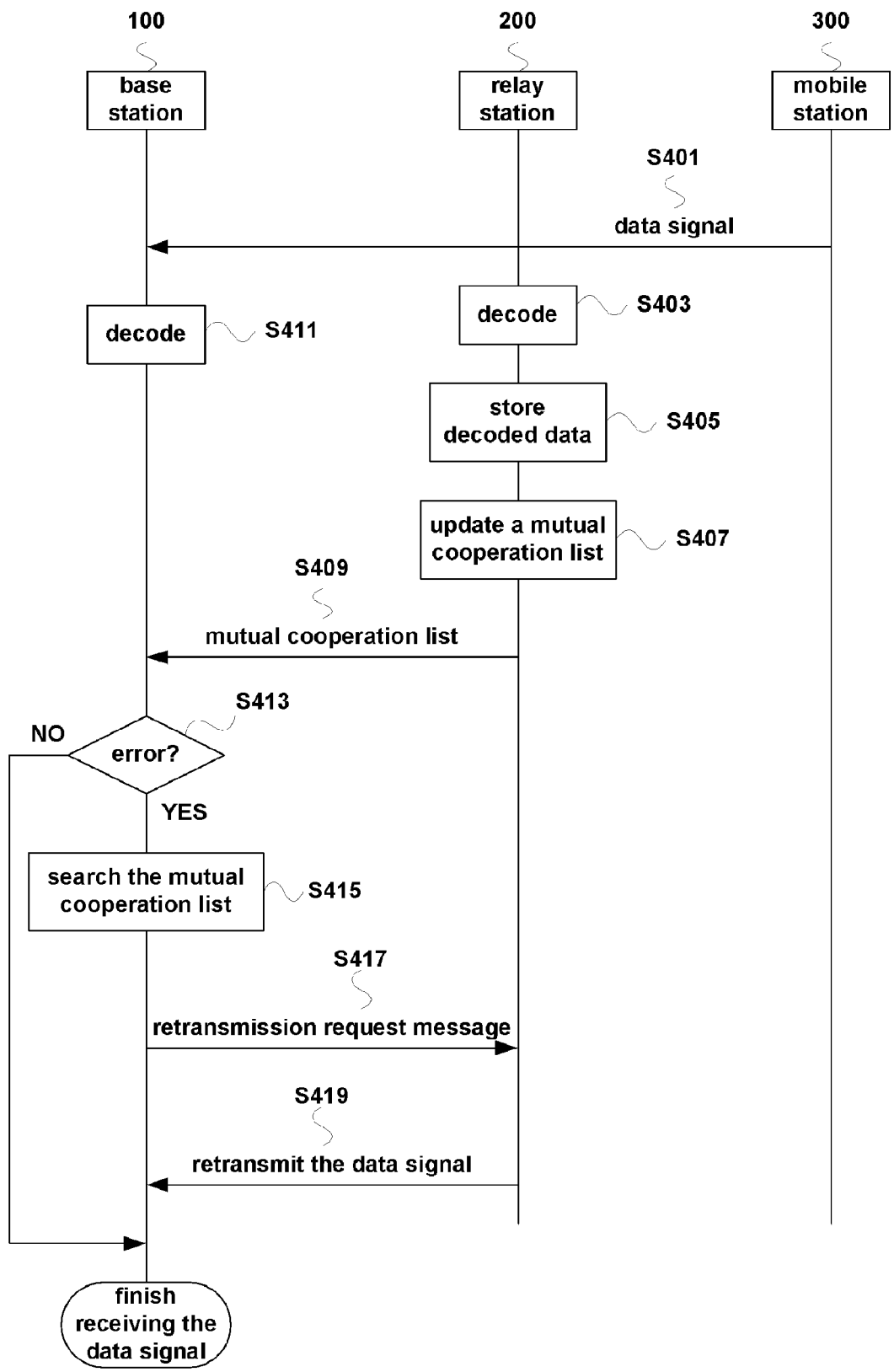

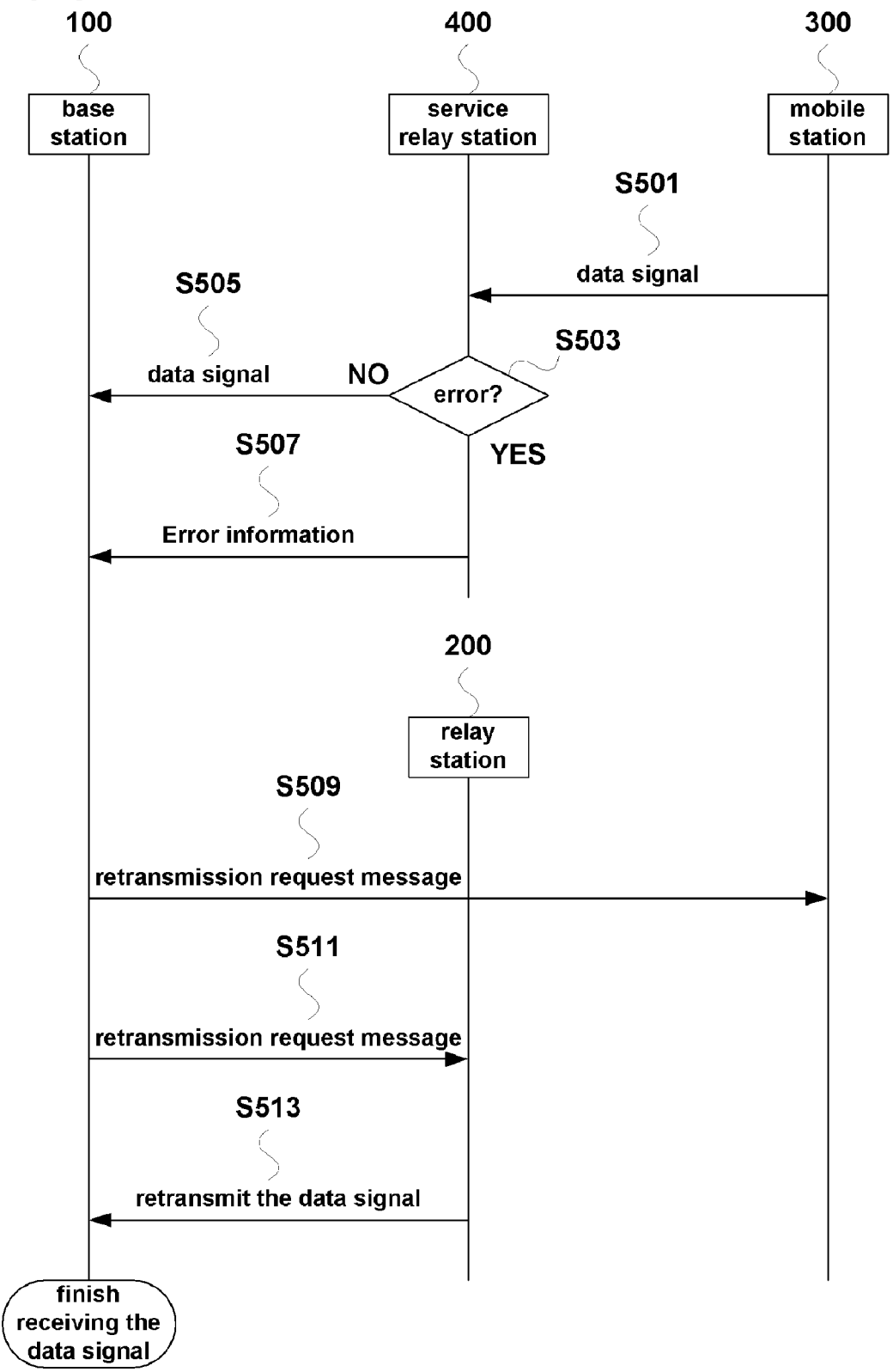

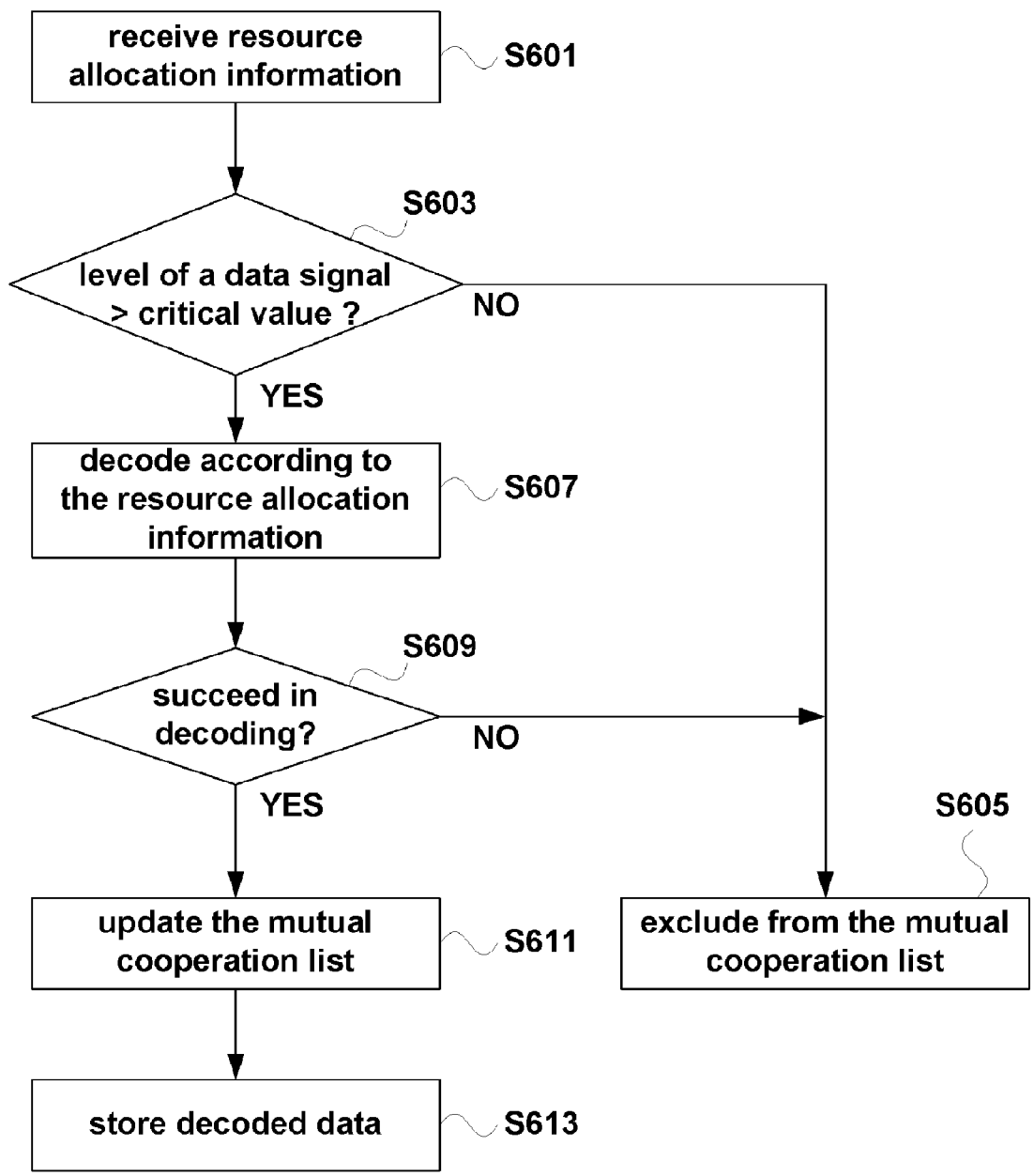
[Fig. 9]

METHOD FOR RELAYING BETWEEN A BASE STATION AND A MOBILE STATION

RELATED APPLICATIONS

This application is a 35 U.S.C. §371 national stage filing of International Application No. PCT/KR2007/003441 filed on Jul. 16, 2007, which claims priority to, and the benefit of, Korean Patent Application No. 10-2006-0095517 filed on Sep. 29, 2006. The contents of the aforementioned applications are hereby incorporated by reference.

TECHNICAL FIELD

The present invention relates to a relay station, a base station, and a method for relaying between the base station and a mobile station. In particular, the present invention relates to an apparatus and a method for relaying between the base station and the mobile station when retransmitting a signal.

This work was supported by the IT R&D program of MIC/IITA [2006-S-001-01, Development of Adaptive Radio Access and Transmission Technologies for 4th Generation Mobile Communications].

BACKGROUND ART

A prior cellular system used a frequency of 2 GHz bands, but a cellular system for next generation mobile communication must use a high frequency of 2-6 GHz bands. As this high frequency has robust straightness, the cellular system for next generation mobile communication has many shadow areas generated by obstacles such as high buildings. Also, as a radio wave of a high frequency band has a large path loss, cell coverage of the cellular system for next generation mobile communication is smaller than that of the prior cellular system. As signal-to-noise ratios (Eb/No) become smaller because of limited power for improved transmission speed of next generation mobile communication, cell coverage becomes increasingly smaller.

For solving coverage or data rate, research regarding low-cost relay stations is progressing according to IEEE 802.16j, WINNER project, etc. Through introducing these relay stations, cell coverage, transmission efficiency, etc., are increased, but it generates many problems such as synchronization, handover, and interference between cells. In particular, technology for handover between a base station and a relay station, and technology for handover between relay stations are necessary. Also, the cellular system may realize distributed multiple antennas through mutual cooperation of the relay stations to get many advantages that can be obtained in the distributed multiple antennas system. However, it reduces resource reuse efficiency and increases interference.

DISCLOSURE OF INVENTION

Technical Problem

The present invention has been made in an effort to provide an apparatus and a method for relaying efficiently between the base station and the mobile station when retransmitting a signal.

Technical Solution

A relay station for relaying between a mobile station and a base station according to an exemplary embodiment of the present invention receives a signal that the mobile station transmits to the base station or a service relay station, decodes the signal to generate a decoded signal, and confirms existence of an error of the decoded signal. The relay station stores the signal in a storage if the error does not exist, and transmits the signal in the storage to the base station, if a request message for the signal is received from the base station.

At this time, the relay station may decode the signal, if a level of the signal is more than a critical value. Also, the relay station may receive resource allocation information that the base station broadcasts, and decode the signal according to the resource allocation information.

A relay station for relaying between a mobile station and a base station according to another exemplary embodiment of the present invention comprises a first storage, a decoder, and a retransmitter. The decoder decodes a signal that the mobile station transmits to the base station or a service relay station to generate a decoded signal, and stores the signal to the first storage if an error of the decoded signal does not exist. The retransmitter transmits the signal in the first storage to the base station if a request message for the signal is received from the base station.

At this time, the relay station may further comprise a second storage. The second storage may store a mutual cooperation list, and the decoder may add an identifier of the decoded signal to the mutual cooperation list, if the error does not exist.

A base station for receiving a signal from a mobile station in cooperation with a relay station according to an exemplary embodiment of the present invention receives the signal that the mobile station transmits, decodes the signal to generate a decoded signal, and confirms existence of an error of the decoded signal. The base station transmits a retransmission request message for the signal to the mobile station if the error exists, and receives a signal corresponding to the retransmission request message from the mobile station and the relay station.

A base station for receiving a signal from a mobile station in cooperation with a relay station according to another exemplary embodiment of the present invention, decodes a signal that the mobile station transmits to generate a decoded signal. If the decoded signal has an error, the base station searches a cooperation relay station capable of transmitting the signal with the error. The base station transmits a retransmission request message for the signal with the error to the cooperation relay station, and receives a signal corresponding to the retransmission request message from the cooperation relay station.

A base station for receiving a signal from a mobile station in cooperation with a relay station according to another exemplary embodiment of the present invention, receives, from the relay station, a mutual cooperation list including a list of mobile stations that transmit signals that the relay station can retransmit. The base station receives a signal from the mobile station, and decodes the signal to generate a decoded signal. If the decoded signal has an error, the base station confirms existence of an identifier of the mobile station in the mutual cooperation list. If the mutual cooperation list comprises the identifier of the mobile station, the base station transmits a retransmission request message for the signal with the error to the relay station.

A base station for receiving a signal from a mobile station in cooperation with a relay station according to another exemplary embodiment of the present invention receives, from the relay station, a mutual cooperation list including a list of signals that the relay station can retransmit. The base station receives a signal from the mobile station, and decodes the signal to generate a decoded signal. If the decoded signal has an error, the base station confirms existence of an identifier of the signal with the error in the mutual cooperation list. If the mutual cooperation list comprises the identifier of the signal with the error, the base station transmits a retransmission request message for the signal with the error to the relay station.

A base station according to another exemplary embodiment of the present invention receives a signal from a mobile station served by a first relay station in cooperation with a second relay station. If error information on the signal is received from the first relay station, the base station transmits a retransmission request message for the signal to the mobile station so that the mobile station retransmits a signal corresponding to the retransmission request message to the first relay station. The base station receives the signal corresponding to the retransmission request message from the first relay station and the second relay station.

A base station according to another exemplary embodiment of the present invention receives a signal from a mobile station served by a first relay station in cooperation with a second relay station. The base station receives error information on the signal from the first relay station, searches a cooperation relay station capable of transmitting a signal corresponding to the error information, transmits a retransmission request message for the signal corresponding to the error information to the cooperation relay station, and receives a signal corresponding to the retransmission request message from the cooperation relay station.

A base station according to another exemplary embodiment of the present invention receives a signal from a mobile station served by a first relay station in cooperation with a second relay station. The base station receives, from the second relay station, a mutual cooperation list including a list of identifiers of mobile stations that transmit signals that the second relay station can retransmit. If error information on the signal is received from the first relay station, the base station confirms existence of an identifier of a mobile station that transmits the signal corresponding to the error information in the mutual cooperation list. If the mutual cooperation list comprises an identifier of the mobile station that transmits the signal corresponding to the error information, the base station transmits a retransmission request message for the signal to the second relay station.

A base station according to another exemplary embodiment of the present invention receives a signal from a mobile station served by a first relay station in cooperation with a second relay station. The base station receives, from the second relay station, a mutual cooperation list including a list of identifiers of signals that the second relay station can retransmit. If error information on the signal is received from the first relay station, the base station confirms existence of an identifier of a signal corresponding to the error information in the mutual cooperation list. If the mutual cooperation list comprises an identifier of the signal corresponding to the error information, the base station transmits a retransmission request message for the signal to the second relay station.

BRIEF DESCRIPTION OF THE DRAWINGS

FIG. 1 is a diagram representing a cellular system according to an exemplary embodiment of the present invention.

FIG. 2 is a block diagram representing a base station according to an exemplary embodiment of the present invention.

FIG. 3 is a block diagram representing a relay station according to an exemplary embodiment of the present invention.

FIG. 4 is a flow chart representing a communication method according to a first exemplary embodiment of the present invention.

FIG. 5 is a flow chart representing a communication method according to a second exemplary embodiment of the present invention.

FIG. 6 is a flow chart representing a communication method according to a third exemplary embodiment of the present invention.

FIG. 7 is a flow chart representing a communication method according to a fourth exemplary embodiment of the present invention.

FIG. 8 is a flow chart representing a communication method according to a fifth exemplary embodiment of the present invention.

FIG. 9 is a flow chart representing a decoding method of a relay station according to an exemplary embodiment of the present invention.

MODE FOR THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Unless explicitly described to the contrary, the word "comprise" will be understood to imply the inclusion of stated elements but not the exclusion of any other elements.

A connection between a base station and a relay station will be called a BR link, a connection between the relay station and a mobile station will be called an RM link, and a connection between the base station and the mobile station will be called a BM link. Since the relay station may use a highly-located antenna, an antenna with good reception sensitivity, multiple antennas, a directional antenna, etc., reception performance of the BR link is better than that of the BM link and the RM link.

A cellular system according to an exemplary embodiment of the present invention will now be described with reference to FIG. 1.

FIG. 1 is a diagram representing a cellular system according to an exemplary embodiment of the present invention.

As shown in FIG. 1, the cellular system according to an exemplary embodiment of the present invention comprises a base station 1, a first relay station 2, a second relay station 3, a first mobile station 4, a second mobile station 5, and a third mobile station 6. The base station 1 manages one or more cells. The first relay station 2 and the second relay station 3 relay between the base station 1 and mobile stations belonging to shadow areas in a cell that the base station 1 manages.

The base station 1 communicates with the first relay station 2 through a BR link 12, and communicates with the second relay station 3 through a BR link 13. Also, the base station 1 communicates with the first mobile station 4 through a BM link 14, and communicates with the second mobile station 5 through a BM link 15.

The first mobile station 4 may communicate with the base station 1 through the BM link 14, and may also communicate with the base station 1 via the second relay station 3 through an RM link 34 and the BR link 13.

The second mobile station 5 may communicate with the base station 1 through the BM link 15. However, since the second mobile station 5 is far from the base station 1, the BM link 15 has great path loss and a shadow area. Therefore, channel performance of the BM link 15 is poor. Hence, the second mobile station 5 may receive a broadcast channel of the base station 1, but it is difficult for the second mobile station 5 to receive a data channel of the base station 1. Therefore, it is better for the second mobile station 5 to communicate with the base station 1 via the first relay station 2 through an RM link 25 and the BR link 12, or to communicate with the base station 1 via the second relay station 3 through an RM link 35 and the BR link 13.

Since the third mobile station 6 is far from the base station 1, it communicates with the base station 1 via the second relay station 3 through the BR link 36 and the BR link 13.

A base station 100 according to an exemplary embodiment of the present invention will now be described with reference to FIG. 2.

FIG. 2 is a block diagram representing a base station according to an exemplary embodiment of the present invention.

As shown in FIG. 2, the base station 100 comprises a signal receiver 110, and a retransmission requestor 120. The signal receiver 110 receives and decodes data signals from a mobile station served by the base station 100. The retransmission requestor 120 requests retransmission of a data signal that the signal receiver 110 fails to decode. Components of the base station 100 will be described in detail later.

A relay station 200 according to an exemplary embodiment of the present invention will now be described with reference to FIG. 3.

FIG. 3 is a block diagram representing a relay station according to an exemplary embodiment of the present invention.

As shown in FIG. 3, the relay station 200 comprises a decoder 210, a mutual cooperation list manager 220, a decoded data storage 230, and a retransmitter 240. The decoder 210 decodes a data signal that a mobile station transmits to a base station, and stores a decoded data signal to the decoded data storage 230. The mutual cooperation list manager 220 manages a mutual cooperation list. Here, the mutual cooperation list comprises a list of identifiers of data signals that the decoder 210 decodes. Also, the mutual cooperation list may further comprise identifiers of mobile stations that transmit the data signals. The decoded data storage stores decoded data signals that the decoder 210 decodes. The retransmitter 240 transmits data signals of the decoded data storage 230 to the base station 100 through a request of the base station 100.

Communication methods between a base station and a mobile station according to various exemplary embodiments of the present invention will now be described with reference to FIG. 4 to FIG. 8.

FIG. 4 is a flow chart representing a communication method according to first exemplary embodiment of the present invention.

Firstly, the mobile station 300 transmits a data signal to the base station 100 in step S101.

On the other hand, if the mobile station 300 transmits the data signal to the base station 100 while the decoder 210 of the relay station 200 is monitoring a resource that the base station 100 uses, the decoder 210 decodes the data signal in step S103. The decoder 210 of the relay station 200 stores the decoded data signal to the decoded data storage 230 in step S105.

Next, in step S107, the decoder 210 of the relay station 200 adds and stores an identifier of the decoded data signal and an identifier of the mobile station 300 that transmits the data signal, to a mutual cooperation list.

Meanwhile, in step S109, the signal receiver 110 of the base station 100 receives and decodes the data signal that the mobile station 300 transmits. The retransmission requestor 120 of the base station 100 confirms existence of an error of the decoded data signal that the signal receiver 110 decodes in step S111. If the error exists, the retransmission requestor 120 transmits a retransmission request message to the mobile station 300 through a radio channel in step S113.

The mobile station 300 that receives the retransmission request message retransmits a data signal corresponding to the retransmission request message to the base station 100 in step S115. However, since the data signal that the mobile station 300 transmitted before has the error, the possibility that channel environments of a BM link are not good is great. Therefore, the possibility that the data signal that the mobile station 300 retransmits is errorlessly transmitted to the base station 100 is not very great.

For solving this, the retransmitter 240 of the relay station 200 according to the first exemplary embodiment of the present invention monitors the retransmission request message that the retransmission requestor 120 of the base station 100 transmits to the mobile station 300. If the retransmitter 240 confirms the retransmission request message, it confirms existence of an identifier of the data signal corresponding to the retransmission request message in the mutual cooperation list that the mutual cooperation list manager 220 manages. If the identifier of the data signal exists in the mutual cooperation list, the retransmitter 240 confirms existence of the data signal corresponding to the retransmission request message in the decoded data storage 230. If existing, the retransmitter 240 transmits the data signal to the base station 100 in step S117. Thus, the relay station 200 transmits the signal with the error to the base station 100 instead of the mobile station 300, and below, this signal transmission will be called 'mutual cooperation transmission.'

Since the retransmission requestor 120 of the base station 100 receives the data signals from both the mobile station 300 and the relay station 200 through the retransmission request message, it selects an errorless data signal among the received data signals in step S119.

On the other hand, in the case that the mobile station 300 and the relay station 200 retransmit the data signal through the same resource (a same frequency resource and a same time resource) in steps S115 and S117, the base station 100 need not perform the operation such as step S119 and can re-receive the data signal with diversity gain or signal-to-noise ratio (SNR) gain.

FIG. 5 is a flow chart representing a communication method according to a second exemplary embodiment of the present invention.

Firstly, the mobile station 300 transmits a data signal to the base station 100 in step S201.

On the other hand, if the mobile station 300 transmits the data signal to the base station 100 while the decoder 210 of the relay station 200 is monitoring a resource that the base station 100 uses, the decoder 210 decodes the data signal in step S203. The decoder 210 of the relay station 200 stores a decoded data signal to the decoded data storage 230 in step S205.

Next, in step S207, the decoder 210 of the relay station 200 adds and stores an identifier of the decoded data signal and an identifier of the mobile station 300 that transmits the data signal to a mutual cooperation list.

On the other hand, in step S209, the signal receiver 110 of the base station 100 receives and decodes the data signal that the mobile station 300 transmits. In step S211, the retransmission requestor 120 of the base station 100 confirms existence of an error of a decoded data signal that the signal receiver 110 decodes. If the error exists, the retransmission requestor 120, in step S213, transmits a retransmission confirmation request message to the relay station 200 and other relay stations in a cell that the base station 100 manages. That is, the retransmission requestor 120 of the base station 100 searches relay stations being capable of mutual cooperation retransmission for the data signal with the error through the retransmission confirmation request message. The retransmitter 240 of the relay station 200 that receives the retransmission confirmation request message confirms existence of an identifier of the data signal corresponding to the retransmission confirmation request message in the mutual cooperation list manager 220. If the identifier of the data signal exists in the mutual cooperation list manager 220, in step S215, the retransmitter 240 transmits, to the base station 100, a retransmission confirmation response message that comprises information on capability of retransmitting the data signal with the error instead of the mobile station 300.

In step S217, the retransmission requestor 120 of the base station 100 searches the relay stations being capable of mutual cooperation retransmission for the data signal with the error through the retransmission confirmation response message, and transmits, in step S219, a retransmission request message of the data signal with the error to the relay station 200 being capable of mutual cooperation retransmission.

The retransmitter 240 of the relay station 200 that receives the retransmission request message confirms existence of the data signal corresponding to the retransmission request message in the decoded data storage 230. If the data signal exists, the retransmitter 240 transmits the data signal to the base station 100 in step S221. Since the BR link generally has good channel environments, the retransmission requestor 120 of the base station 100 errorlessly can receive the data signal that it requests.

On the other hand, with the result that the retransmission requestor 120 of the base station 100 searches the relay stations being capable of mutual cooperation retransmission for the data signal with the error through the retransmission confirmation response message, if the relay station being capable of mutual cooperation retransmission does not exist, the retransmission requestor 120 of the base station 100 transmits a retransmission request message to the mobile station 300 in step S223. The mobile station 300 retransmits the data signal corresponding to the retransmission request message to the base station 100 in step S225.

FIG. 6 is a flow chart representing a communication method according to a third exemplary embodiment of the present invention.

Firstly, the mutual cooperation list manager 220 of the relay station 200 continually updates the mutual cooperation list in step S301, transmits the mutual cooperation list to the retransmission requestor 120 of the base station 100 in step S303. At this time, the relay station 200 may transmit the mutual cooperation list to the retransmission requestor 120 through an Ack for Cooperative Relaying (ACR) channel. The base station 100 may monitor an RM link through the mutual cooperation list.

On the other hand, if the mobile station 300 transmits a data signal to the base station 100 in step S305, the decoder 210 of the relay station 200 decodes, in step S307, the data signal that the mobile station 300 transmits to the base station 100. The decoder 210 of the relay station 200 stores a decoded data signal to the decoded data storage 230 in step S309.

Next, in step S311, the decoder 210 of the relay station 200 adds and stores an identifier of the decoded data signal and an identifier of the mobile station 300 that transmits the data signal to a mutual cooperation list.

On the other hand, in step S313, the signal receiver 110 of the base station 100 receives and decodes the data signal that the mobile station 300 transmits. In step S315, the retransmission requestor 120 of the base station 100 confirms existence of an error of the decoded data signal that the signal receiver 110 decodes. If the error exists, the retransmission requestor 120 confirms existence of an identifier of the mobile station 300 that transmits the data signal with the error in the mutual cooperation list in step S317. At this time, since the retransmission requestor 120 of the base station 100 can receive the mutual cooperation list from a plurality of relay stations, it can confirm a relay station to mutually cooperate for the data signal with the error. The retransmission requestor 120 that confirms, in the mutual cooperation list, existence of the identifier of the mobile station 300 that transmits the data signal with the error, transmits a retransmission request message to the relay station 200 in step S319.

The retransmitter 240 of the relay station 200 that receives the retransmission request message confirms existence of the data signal corresponding to the retransmission request message in the decoded data storage 230. If the data signal exists, the retransmission 240 transmits the data signal corresponding to the retransmission request message to the base station 100 in step S321. That is, the retransmitter 240 performs 'mutual cooperation retransmission.' Since the BR link generally has good channel environments, the retransmission requestor 120 of the base station 100 errorlessly can receive the data signal that it requests.

On the other hand, if the retransmission requestor 120 of the base station 100 confirms, in the mutual cooperation list, lack of the identifier of the mobile station 300 that transmits the data signal with the error in step S317, it transmits a retransmission request message to the mobile station 300 so that the mobile station 300 retransmits the data signal with the error.

FIG. 7 is a flow chart representing a communication method according to a fourth exemplary embodiment of the present invention.

Firstly, if the mobile station 300 transmits a data signal to the base station 100 in step S401, the decoder 210 of the relay station 200 decodes the data signal that the mobile station 300 transmits to the base station 100 in step S403. The decoder 210 of the relay station 200 stores a decoded data signal to the decoded data storage 230 in step S405.

Next, in step S407, the decoder 210 of the relay station 200 adds and stores an identifier of the decoded data signal and an identifier of the mobile station 300 that transmits the data signal to a mutual cooperation list.

The mutual cooperation list manager 220 of the relay station 200 transmits the mutual cooperation list to the retransmission requestor 120 of the signal receiver 110 in step S409. That is, the relay station 200 according to the fourth exemplary embodiment of the present invention performs decoding each time it receives the data signal that the mobile station 300 transmits to the base station 100, updates the mutual cooperation list, and transmits the updated mutual cooperation list to the base station 100.

On the other hand, in step S411, the signal receiver 110 of the base station 100 receives and decodes the data signal that the mobile station 300 transmits. In step S413, the retransmission requestor 120 of the base station 100 confirms existence of an error of the decoded data signal that the signal receiver 110 decodes. If the error exists, the retransmission requestor 120 confirms existence of an identifier of the data signal with the error, in the mutual cooperation list in step S415. At this time, since the retransmission requestor 120 of the base station 100 can receive the mutual cooperation list from a plurality of relay stations, it can confirm a relay station to mutually cooperate for the data signal with the error. The retransmission requestor 120 that confirms, in the mutual cooperation list, existence of the identifier of the data signal with the error, transmits a retransmission request message to the relay station 200 in step S417.

The retransmitter 240 of the relay station 200 that receives the retransmission request message transmits the data signal corresponding to the retransmission request message to the base station 100 in step S419. That is, the retransmitter 240 performs 'mutual cooperation retransmission.' Since the BR link generally has good channel environments, the retransmission requestor 120 of the base station 100 errorlessly can receive the data signal that it requests.

On the other hand, if the retransmission requestor 120 of the base station 100 confirms lack of the identifier of the data signal with the error in the mutual cooperation list in step S415, it transmits a retransmission request message to the mobile station 300 so that the mobile station 300 retransmits the data signal with the error.

FIG. 8 is a flow chart representing a communication method according to a fifth exemplary embodiment of the present invention.

In the fifth exemplary embodiment of the present invention, the mobile station 300 is a mobile station served by a service relay station 300.

That is, the mobile station 300 transmits a data signal to the service relay station 400 in step S501.

Next, in step S503, the service relay station 400 confirms existence of an error of the data signal that the mobile station 300 transmits. If the error does not exist, in step S505, the service relay station 400 transmits, to the base station 100, the data signal that the mobile station 300 transmits However, if the error exists, the service relay station 400 transmits error information, instead of the data signal that the mobile station 300 transmits, to the signal receiver 110 of the base station 100 in step S507.

The base station 100 may perform operations according to the first to fourth exemplary embodiment of the present invention after receiving the error information. That is, the retransmission requestor 120 of the base station 100 that receives the error information from the service relay station 400 may transmit a retransmission request message for the data signal corresponding to the error information through a radio channel to the mobile station 300 like the first exemplary embodiment of the present invention in step S509, or transmit a retransmission request message to the relay station 200 like the second to fourth exemplary embodiments of the present invention in step S511.

The retransmitter 240 of the relay station 200 confirms existence of the data signal corresponding to the retransmission request message in the decoded data storage 230. If the data signal exists, the retransmitter 240 transmits the data signal to the base station 100 in step S513. That is, the retransmitter 240 performs 'mutual cooperation retransmission.'

A decoding method of a relay station according to an exemplary embodiment of the present invention will now be described with reference to FIG. 9.

FIG. 9 is a flow chart representing a decoding method of a relay station according to an exemplary embodiment of the present invention.

As shown in FIG. 9, in step S601, the decoder 210 receives resource allocation information that the base station 100 broadcasts.

According to the resource allocation information, the decoder 210 extracts a data signal that the mobile station transmits to the base station 100, and in step S603 confirms whether the level of the extracted data signal is greater than a critical value $SNR_{Thr}$. That is, the decoder 210 performs decoding only for mobile stations being comparatively close to the relay station 200 among mobile stations in a cell that the base station 100 manages. In step S605, the decoder 210 excludes, from the mutual cooperation list, data signals with a signal level being smaller than the critical level.

Next, in step S607, according to the resource allocation information the decoder 210 decodes the data signal with a signal level being greater than the critical level.

If the decoder 210 succeeds in decoding in step S609, that is, if an error of the data signal does not exist, the decoder 210 adds and stores an identifier of the decoded data signal and an identifier of the mobile station that transmits the data signal to the mutual cooperation list in step S611. The decoder 210 stores the decoded data signal to the decoded data storage 230 in step S613.

The above-described exemplary embodiments have been described according to an uplink, but they may be adapted to a downlink.

According to exemplary embodiments of the present invention, since the relay station can previously decode and store signals that mobile stations transmit to a base station so that the relay station may transmit decoded signals to the base station through a BR link with good channel environments according to a request of the base station, resource reuse efficiency may be increased and interference may be reduced when the base station requests retransmission of the signal.

In particular, according to exemplary embodiments of the present invention, since an error rate may be reduced when the base station requests retransmission of the signal, it is easy to adapt to a service being sensitive to time delay.

Besides, according to exemplary embodiments of the present invention, since retransmission may be performed by not the mobile station but only the relay station, power of the mobile station may be reduced. In addition, since a BR link with good channel environments may be used, resource reuse efficiency may become improved.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for relaying between a mobile station and a base station, comprising:
   receiving a signal at a relay station that the mobile station transmits to the base station or to the relay station;
   decoding the signal to generate a decoded signal;
   determining whether an error of the decoded signal exists based on whether the signal is successfully decoded;
   storing the signal to a storage if the error does not exist; and
   transmitting the signal in the storage to the base station, if a retransmission request message for the signal is received from the base station.

2. The method of claim 1, wherein decoding the signal comprises:
   decoding the signal if a level of the signal is more than a critical value.

3. The method of claim 2, wherein decoding the signal further comprises:
   receiving resource allocation information that the base station broadcasts; and
   decoding the signal according to the resource allocation information.

4. The method of claim 1, further comprising:
   adding an identifier of the decoded signal to a mutual cooperation list if the error does not exist.

5. The method of claim 4, wherein transmitting the signal to the base station comprises:
   transmitting the signal to the base station if the mutual cooperation list comprises the identifier of the signal corresponding to the request message.

6. The method of claim 5, further comprising:
   providing the mutual cooperation list to the base station.

7. The method of claim 6, wherein the request message corresponds to a message that the base station transmits to the mobile station.

* * * * *